UNITED STATES PATENT OFFICE.

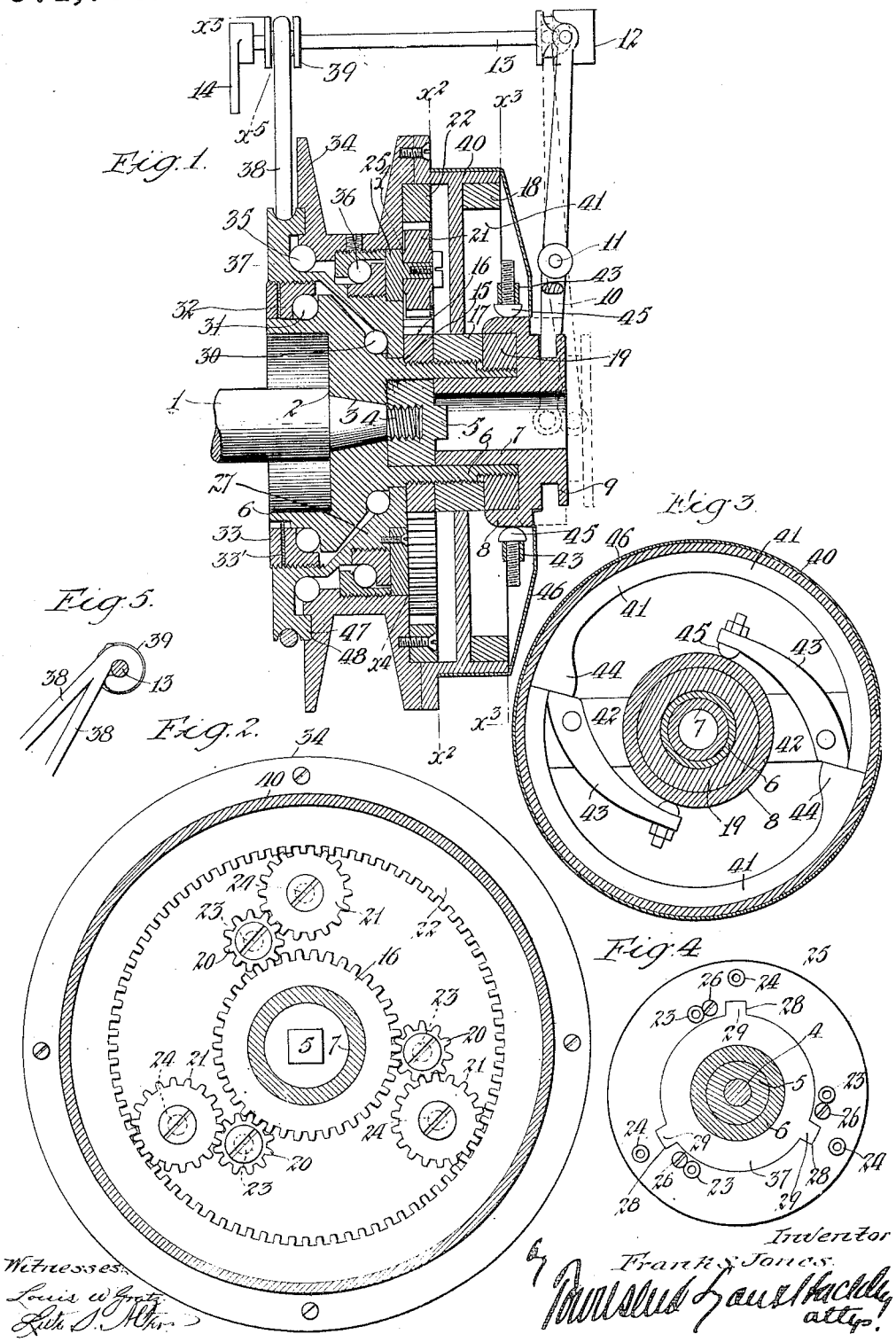

FRANK S. JONES, OF PASADENA, CALIFORNIA.

MOTOR-CYCLE GEARING.

971,756.  Specification of Letters Patent.  Patented Oct. 4, 1910.

Application filed February 26, 1910. Serial No. 546,236.

*To all whom it may concern:*

Be it known that I, FRANK S. JONES, a citizen of the United States, residing at Pasadena, in the county of Los Angeles and State of California, have invented a new and useful Motor-Cycle Gearing, of which the following is a specification.

This invention relates to motor cycle gearing and the object of the invention is to provide transmission gearing especially adapted for motor cycles, whereby the gearing may be rendered idle or two speeds forward may be obtained and the mechanism combined in a most compact form.

Referring to the drawings: Figure 1 is a cross section through the gearing. Fig. 2 is a cross section on line $x^2$—$x^2$ Fig. 1. Fig. 3 is a section on line $x^3$—$x^3$ Fig. 1. Fig. 4 is a section on line $x^4$—$x^4$ Fig. 1. Fig. 5 is a section on line $x^5$—$x^5$ Fig. 1.

1 designates a driving shaft having a shoulder 2, tapered portion 3 and threaded end 4 upon which is screwed a nut 5. Secured to the shaft 1 by means of the nut 5 is a sleeve 6 which always revolves with the shaft 1. Slidable in the outer end of the sleeve 6 is a hollow stem 7 having a rounded flange 8 with annularly grooved extension 9, which is engaged by a forked lever 10 pivoted at 11 and operated by a cam 12 on a shaft 13 which is controlled by a lever 14, the stem 7 being non-rotatable with the sleeve 6.

Screwed against a shoulder 15 on the sleeve 6 is a driving pinion 16, the inner face of the pinion 16 bears against the hub 17 of a clutch 18, the pinion 16 and clutch being prevented from turning on the sleeve 6 by a lock nut 19 screwed on a reverse thread on the end of the sleeve 6.

Meshing with the driving pinion 16 are three idle pinions 20, which in turn mesh with idle pinions 21, the latter meshing with an internal gear 22. The pinions 20 and 21 are mounted on studs 23 and 24 formed on a disk or ring 25. The ring 25 is fastened by screws 26 to the inner end of a cone 27 and is provided with notches 28 adapted to receive projection 29 on the sleeve 27, so that the ring 25 and cone 27 are as one piece and are rotatable with respect to the sleeve 6, the cone 27 being supported by ball races 30 and 31 bearing on the sleeve 6. One half of the race 31 is formed in a ring 32 screwed into the end of the cone 27 and secured therein by a lock nut 33 and washer 33'.

The internal gear 22 is rigidly secured to a driving pulley which may be of any desired form. In the present instance I have shown a grooved driving pulley 34 which is supported by ball races 35 and 36 bearing on the cone 27. The cone 27 is provided with a grooved disk 37 over which passes a brake band 38, the two ends of which are connected to a pulley 39 on the shaft 13, both ends of the band 38 extend to the same side of the pulley 39 and are secured to the pulley as shown in Fig. 5, so that when the shaft 13 is turned in one direction it will tighten the band 38 in the grooved disk 37 and prevent the rotation of the disk. Secured to the grooved driving pulley 34 is a disk or drum 40 for engagement by the clutch 18. The clutch 18 has two expansible friction members 41 formed as a part of spokes 42 on the hub 17. Arms or levers 43 pivoted to the spokes 42 engage at their outer ends lugs 44 on the friction members 41 and are provided at their inner ends with rounded pins 45 which are engaged by the rounded flange 8 on the stem 7.

A sheet metal dust guard 46 is provided which fits over the drum 40 and extends inwardly over the face of the drum and clutch members. The disk 37 has an extension 47 fitting into a groove 48 in the driving pulley 34 to prevent the entrance of dust and dirt between the cone and adjacent parts.

In operation when the shaft 13 is adjusted in mid position, so that the brake band is loose on disk 37 and the lever 10 engages in the straight portion of the cam 12, as shown in dotted position in Fig. 1, the rotating driving shaft 1 will drive sleeve 6, gear 16, pinions 20 and 21, but as the ring 25 upon which the pinions 20 and 21 are mounted is capable of rotating, the pinions 20 and 21 partake of a bodily movement carrying the ring 25 with them, the pinions 20 being rolled around gear 16 and the pinions 21 being rolled around the internal gear 22 without imparting rotation to the internal gear 22 and the driving pulley 34. During such operation the cone 27 revolves freely in the ball races 35 and 36 and the clutch 18 revolves freely in the drum 40. The clutch 18, although rotating at such time with the sleeve 6, does not impart rotation to the drum 40 and the pulley 34 because the friction members 41 are loose, the arms 43 being relaxed and the stem in the position shown in dotted lines in Fig. 1.

When it is desired to drive the grooved pulley 34 ahead at slow speed, the arm 14 is operated to turn the shaft 13 in the direction of the arrow Fig. 1, thereby tightening the brake band 38, but not deflecting the lever 10, the latter continuing in engagement with the straight portion of cam 12 and thus not imparting movement to arms 43. As the brake band 38 is tightened it holds the cone 27 stationary, together with ring 25 and thus holds the studs 23 and 24 and the pinions 20 and 21 stationary, so that as sleeve 6 rotates with shaft 1, it rotates gear 16, the latter imparts rotation to the pinions 20 and 21, which in turn impart rotation to the grooved pulley 34 in the same direction as shaft 1, but at a slower speed. The difference in speed being the ratio between the gears.

When it is desired to drive the grooved pulley 34 at faster speed, the shaft 13 is turned in a direction opposite to the arrow Fig. 1, which loosens the brake band 37 and at the same time the lever 10 is tilted by the cam 12 into the position shown in full lines Fig. 1, thereby causing the stem to move inwardly, so that the flange 8 causes the inner ends of the arms 43 to move outwardly, thereby moving the friction members 41 of the clutch to move outwardly into engagement with the drum 40 and thus locking the drum 40 with the sleeve 6, so that all parts revolve at the same speed with sleeve 6 and shaft 1, thereby producing the high speed forward.

What I claim is:

1. A driving shaft, a sleeve rigid thereon, a cone rotatable on said sleeve, said sleeve being nested in said cone, a gear carrying disk fixed to said cone, a friction wheel fixed to the cone, a driving wheel rotatable on said cone and provided with an internal gear, intermediate pinions carried by the gear carrying disk and meshing with the internal gear, a driving gear on the sleeve meshing with the pinions, clutch means for locking the driving pulley with the sleeve, and means for restraining said friction wheel.

2. A driving shaft, a sleeve rigid thereon, a cone rotatable on said sleeve, said sleeve being nested in said cone, a gear carrying disk fixed to the cone, a friction wheel fixed to the cone, a driving wheel rotatable on said cone and provided with an internal gear, pinions carried by the gear carrying disk and meshing with the internal gear, idle pinions carried by said disk meshing with said first named pinions, a driving gear on said sleeve meshing with the idle pinions, clutch means for locking the driving pulley with the sleeve, means for restraining said friction wheel, and a single means for simultaneously applying said clutch means and releasing said friction wheel restraining means.

3. A driving shaft, a sleeve secured thereon, a cone rotatable on said sleeve, said sleeve being nested in said cone, a gear carrying disk fixed to the cone, a friction wheel fixed to the cone, a driving wheel rotatable on said cone and provided with an internal gear, pinions carried by the gear carrying disk and meshing with the internal gear, idle pinions carried by said disk meshing with said first named pinions, a driving gear on said sleeve meshing with the idle pinions, clutch means for locking the driving pulley with the sleeve, means for restraining said friction wheel, a single means for simultaneously applying said clutch means and releasing said friction wheel restraining means, or for releasing said clutch means and applying said friction wheel restraining means, or for holding said clutch unclutched and the friction wheel restraining means free from the friction wheel.

4. A driving shaft, a sleeve rigid thereon, a gear carrying disk rotatable on said sleeve, a driving pinion on said sleeve, intermediate pinions on the gear carrying disk meshing with the driving pinion, a cone secured to the gear carrying disk, a grooved driving pulley journaled on the cone, a friction wheel secured to the cone, an internal gear carried by the driving wheel and meshing with the intermediate pinions, clutch means between said sleeve and driving wheel, a brake band for controlling said friction wheel, and a lever and cam for controlling said clutch means.

5. A driving shaft, a sleeve rigid thereon, a gear carrying disk rotatable on said sleeve, a driving pinion on said sleeve, intermediate pinions on the gear carrying disk meshing with the driving pinion, a cone secured to the gear carrying disk, a grooved driving pulley journaled on the cone, a friction wheel secured to the cone, an internal gear carried by the driving wheel and meshing with the intermediate pinions, clutch means between said sleeve and driving wheel, a brake band for controlling said friction wheel, a lever and cam for controlling said clutch means, a shaft supporting said cam, said brake band being connected to said shaft.

6. A driving shaft, a sleeve secured thereto, a gear carrying disk rotatable on the sleeve, a driving gear on the sleeve, intermediate pinions on the gear carrying disk meshing with the driving gear, a driving wheel rotatable with respect to the gear carrying disk, an internal gear on the driving wheel meshing with the intermediate pinions, a drum secured to the driving wheel, a clutch on said sleeve having arms thereon and friction members coacting with said drum, pivoted levers on said arms engaging with said friction members, a stem slidable in the end of said sleeve, said stem having a flange bearing against the ends of said levers, a pivoted lever engaging said stem for sliding the stem, a cam for operating said latter lever, a friction wheel rigidly connected with the gear carrying disk, a brake band extending over the friction wheel and a shaft supporting said cam, said brake band being connected to said shaft.

7. A driving shaft having a flange, a conical portion next the flange, a threaded end next the conical portion and a sleeve on said shaft having a central opening for receiving said conical portion, said sleeve having a shouldered portion and external threads, a driving pinion screwed on the external threads of the sleeve against said shoulder, a cone on said sleeve against said driving pinion, a gear carrying ring on said cone and secured thereto, intermediate pinions on the gear carrying ring, a grooved driving wheel mounted on the cone, ball races between the driving wheel and said cone, a grooved friction wheel on said cone and provided with an annular rib which engages in an annular recess in the driving wheel, clutch members secured to said sleeve, said grooved driving wheel having a flange extending coacting with said clutch members, pivoted levers on said clutch members for expanding said members, a stem slidable in the end of said sleeve, said stem having a flange bearing against the ends of said levers, a pivoted lever engaging said stem for sliding the stem, a shaft, a cam on said shaft for operating said latter lever, a pulley on said shaft, a brake band extending around said friction wheel, both ends of the brake band being secured to the pulley, on one side thereof, and a lever for operating said shaft.

8. A driving shaft, a sleeve fixed to the end of said shaft, a cone rotatable on said sleeve and having an annular groove therein, said sleeve being nested in said cone, a gear carrying disk fixed to said cone, a driving wheel rotatable on said cone and provided with an internal gear, intermediate pinions carried by the gear carrying disk and meshing with the internal gear, a driving gear on the sleeve and meshing with the pinions, clutch means for locking the driving pulley with the sleeve, and means engaging the groove in said cone to prevent rotation thereof.

9. A driving shaft, a sleeve rigid thereon, a gear carrying disk rotatable on said sleeve, a driving pinion on said sleeve, intermediate pinions on the gear carrying disk meshing with the driving pinion, a cone secured to the gear carrying disk, a grooved driving pulley journaled on the cone, an internal gear carried by the driving wheel and meshing with the intermediate pinions, clutch means between said sleeve and driving wheel, and means for engaging said cone to prevent rotation thereof.

In testimony whereof, I have hereunto set my hand at Los Angeles, California, this 7th day of February, 1910.

FRANK S. JONES.

In presence of—
FRANK L. A. GRAHAM,
P. H. SHELTON.